US012096337B2

(12) United States Patent
Jameson et al.

(10) Patent No.: US 12,096,337 B2
(45) Date of Patent: Sep. 17, 2024

(54) DISTRIBUTED WIRELESS GATEWAY

(71) Applicant: Arista Networks, Inc., Santa Clara, CA (US)

(72) Inventors: Mitchell Ryan Jameson, Vancouver (CA); Chandrashekhar Appanna, Austin, TX (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/306,926

(22) Filed: Apr. 25, 2023

(65) Prior Publication Data

US 2023/0337112 A1 Oct. 19, 2023

Related U.S. Application Data

(63) Continuation of application No. 17/246,464, filed on Apr. 30, 2021, now Pat. No. 11,671,897.

(51) Int. Cl.

*H04W 40/24* (2009.01)
*H04W 40/02* (2009.01)
*H04W 88/16* (2009.01)
*H04W 4/06* (2009.01)

(52) U.S. Cl.

CPC ....... *H04W 40/248* (2013.01); *H04W 40/023* (2013.01); *H04W 88/16* (2013.01); *H04W 4/06* (2013.01)

(58) Field of Classification Search

CPC . H04W 40/248; H04W 40/023; H04W 88/16; H04W 4/06; H04L 12/4633; H04L 12/4641; H04L 45/74

See application file for complete search history.

(56) References Cited

U.S. PATENT DOCUMENTS 10,333,725 B2 6/2019 He et al.
2017/0063668 A1 3/2017 Sivasankar et al.
2018/0343236 A1* 11/2018 Pillay-Esnault ........ H04L 63/20
2019/0132241 A1 5/2019 Vattem et al.
2019/0306112 A1* 10/2019 Augustyn ............. H04L 45/741
2021/0119827 A1 4/2021 Codandam et al.
2021/0185752 A1 6/2021 Samuel et al.
2022/0294665 A1 9/2022 Jameson et al.
2024/0032051 A1* 1/2024 Cirik ..................... H04W 72/21

* cited by examiner

*Primary Examiner* — Shukri Taha
(74) *Attorney, Agent, or Firm* — Fountainhead Law Group, PC

(57) ABSTRACT

A distributed wireless gateway comprises several switches. Each switch is coupled to a respective set of wireless access points. When a given switch receives a packet from one of its wireless access points, it creates a mapping between that access point and the host that sent the packet to the access point. The given switch advertises to other switches in the distributed wireless gateway reachability information that maps that host to the switch, enabling the other switches to identify the given switch as the next hop when they receive a packet destined for that host.

20 Claims, 11 Drawing Sheets

DISTRIBUTED WIRELESS GATEWAY

CROSS REFERENCE TO RELATED APPLICATIONS

This application is a continuation application and, pursuant to 35 U.S.C. § 120, is entitled to and claims the benefit of earlier filed application U.S. application Ser. No. 17/246,464 filed Apr. 30, 2021, the content of which is incorporated herein by reference in its entirety for all purposes.

BACKGROUND

A wireless network deployment typically comprises a deployment of access points (APs) and their associated hosts. The wireless network can include a wireless local area network (LAN) controller (WLC) to which the APs are connected. The WLC provides a centralized monitoring and management services to support the APs in the network. The WLC facilitates centralized management, configuration, and support of the wireless network, and gives the network manager the ability to see all the data and information related to the network.

A typical WLC is a standalone device. The WLC contains all wireless host reachability information centrally located within its forwarding tables. The reachability information enables the WLC to provide switching among hosts associated with the APs in the network. The WLC also acts as a gateway between the wireless network and wired networks, such as a wired LAN, the Internet, etc. The reachability information stored in the WLC informs which APs to forward packets in order to reach the appropriate host.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The centralized nature of a conventional WLC means that all traffic between hosts connected to different APs flow through the WLC. More significantly, all traffic between hosts within the wireless network and external wired networks (e.g., the Internet) flows through the WLC. As such, a conventional WLC can become a bottleneck for access to the wired network under high traffic loads, thus degrading performance. Likewise for traffic between hosts associated with different APs because such traffic flows through the WLC. Furthermore, because all traffic flows through the WLC, the WLC represents a single point failure.

In accordance with some embodiments of the present disclosure, the gateway functionality of the WLC can be distributed among several independently operating network devices to distribute the traffic among the network devices. Further in accordance with the present disclosure, the network devices comprising the distributed gateway can be configured to synchronize/share their host reachability information in order to maintain reachability between hosts connected to different APs in the distributed gateway configuration.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1A:
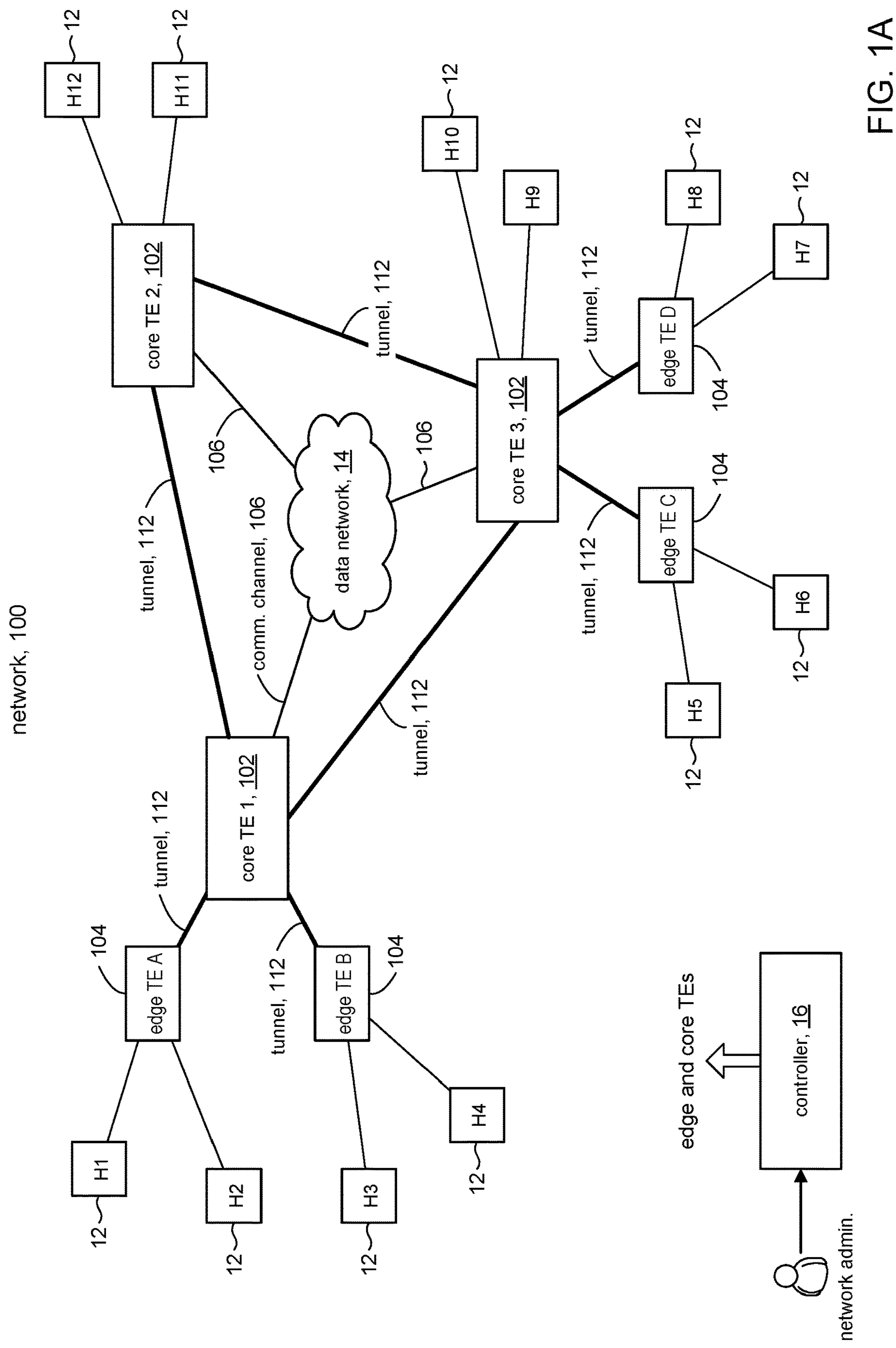
FIG. 1A shows a network deployment in accordance with the present disclosure.

Referring to FIG. 1A, network 100 represents an illustrative example of a network deployment in accordance with some embodiments of the present disclosure. Network 100 provides a communication infrastructure that allows hosts 12 to communicate with each other and with data network 14. Hosts 12 can be server systems (e.g., application servers, file servers, web sites, database systems, etc.) and client devices (e.g., laptop computers, desktop computers, mobile devices, and the like). Data network 14 can include the Internet (e.g., via a public switched telephone network, PSTN), a local area network (LAN) or wide area network (WAN) in an enterprise or campus, and so on. Data network 14 can be referred to as the wired network.

Network 100 can comprise network devices 102, 104. In accordance with some embodiments, network devices 102, 104 can be routers, switches, software running on generic servers, and so on. For reasons that will become clear further below, network devices 102 will be referred to herein as core tunnel endpoints (core TEs), and network devices 104 will be referred to herein as edge tunnel endpoints (edge TEs). Generally, tunnel endpoints are network devices that are configured to support packet tunneling in accordance with a tunneling protocol. Tunnel endpoints at each end of a tunnel encapsulate packets for transmission over the tunnel and decapsulate packets received from the tunnel. The example in FIG. 1A shows three core TEs and four edge TEs, although it will be appreciated that the configuration shown is merely an illustrative example and that network 100 can be deployed with more or fewer core and edge TEs. Core TEs 102 can be connected to other core TEs and to edge TEs 104 by physical connections (e.g., electrical cables, fiber optic cables, etc.), wireless connections, or a combination of physical and wireless connections. Network 100 can be managed and otherwise maintained by a user (e.g., network administrator), for example, using controller 16.

Core TEs 102 can connect to data network 14 via communication channels 106. In some embodiments, for example, communication channels 106 can be physical connections (e.g., electrical cables, fiber optic cables, etc.), wireless connections, or a combination of physical and wireless connections. Some of the communication channels can be wireless. Edge TEs 104 can access data network 14 via the respective core TEs 102 to which the edge TEs are connected.

Hosts 12 can access data network 14 via an edge TE or a core TE. For example, hosts H1-H8 wirelessly communicate with their respective edge TEs to access data network 14. On the other hand, hosts H9-H10 are directly connected to their respective core TEs to access the data network.

Core TEs 102 and edge TEs 104 can communicate with each other via virtual tunnels (tunnels) 112. Tunneling is a known and well understood communication technology. Briefly, when a source host wants to transmit an original packet to a destination host that is reachable over a tunnel, the source host can transmit the original packet to an endpoint of the tunnel (tunnel endpoint). The tunnel endpoint encapsulates the original packet in accordance with a tunneling protocol to create a tunneling packet (tunneled packet, encapsulated packet, etc.) that contains the original packet in its payload and designates a remote tunnel endpoint as its destination. The tunneling packet is routed to the remote tunnel endpoint, which then decapsulates the tunneling packet to recover the original packet. The remote tunnel endpoint then forwards the recovered original packet to the next hop.

Traffic between core TEs 102 and edge TEs 104 can be tunneled using any suitable tunneling protocol such as Virtual Extensible Local Area Network (VxLAN), Generic Routing Encapsulation (GRE), Internet Protocol Security (IPSec), and so on. Merely for discussion purposes, however, VxLAN tunneling will be referenced whenever the discussion calls for specific examples of a tunneling protocol.

In accordance with the present disclosure, core TEs 102 can be configured with multiple tunnels. Core TEs 102 can be configured to perform tunnel endpoint bridging so that a given core TE that is configured with several tunnels can reach corresponding tunnel endpoints (core TEs and edge TEs 102, 104) at the other ends of those tunnels. Bridging generally refers to any forwarding at Layer 2 (L2, the data link layer) of the Open Systems Interconnection (OSI) model based on a packet's L2 header. In the context of the present disclosure, tunnel endpoint bridging involves a tunnel endpoint receiving a tunneled packet on one of its tunnels, decapsulating the packet, re-encapsulating the packet, and forwarding the re-encapsulated packet on another of its tunnels.

Figure 1B:
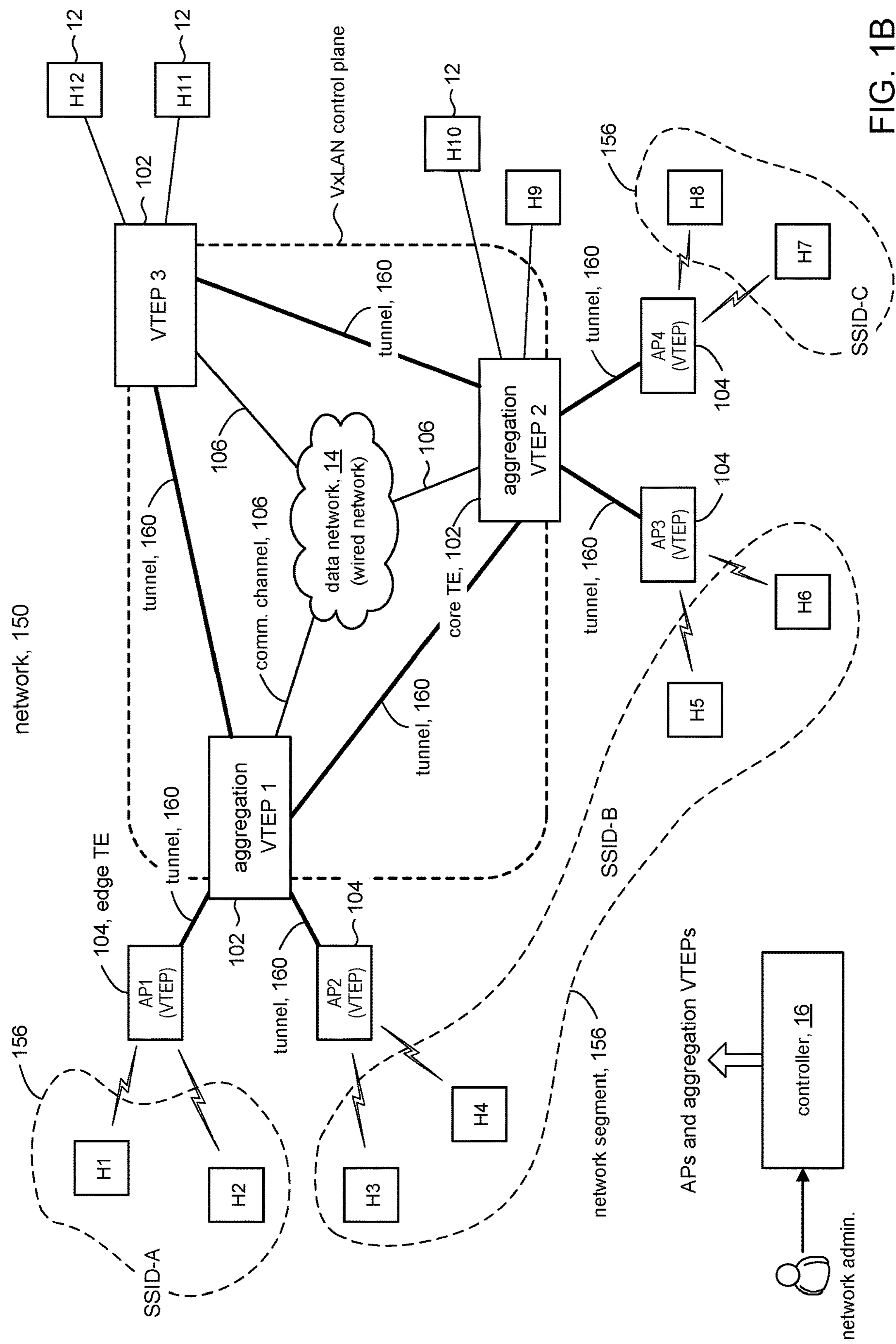
FIG. 1B shows a VxLAN-based network deployment in accordance with the present disclosure.

Referring to FIG. 1B, network 150 represents a specific example of a network in accordance with the present disclosure to illustrate aspects of the present disclosure. Network 150 is a VxLAN deployment based on the VxLAN protocol to provide tunneling among its constituent core TEs 102 and edge TEs 104. Devices that are tunnel endpoints of a tunnel in a VxLAN are referred to as VxLAN tunnel endpoints (VTEPs). Core TEs 102 can be configured as VTEPs. Edge TEs 104 can be configured as wireless access points (APs) to provide their respective associated hosts H1-H8 with wireless access to data network 14 via the core TEs. The edge TEs are also configured as VTEPs to communicate with their respective core TEs. Because VxLAN tunneling is the reference for specific examples, the remainder of the present disclosure will refer to core TEs 102 as "aggregation VTEPs," or more simply as "VTEPs." Edge TEs 104 will be referred to simply as APs with the understanding that APs are also configured as VTEPs; APs are connected to their respective aggregation VTEPs and communicate over VxLAN tunnels 160. The aggregation VTEPs constitute a VxLAN control plane for the purpose of exchanging VxLAN reachability information.

A VTEP that is connected to one or more APs in a network segment can be referred to as an "aggregation" VTEP because the VTEP aggregates traffic from hosts associated with that network segment. VTEP 3, on the other hand, can be referred to as a regular (non-aggregation) VTEP.

The APs may constitute or otherwise define one or more wireless network segments 156 in network 150. Typically, and as used herein, the term "segment" refers to an L2 segment where devices in the segment communicate at the data link layer by transmitting data in units called frames (e.g., Ethernet frames). For example, AP1 defines a network segment identified by the Service Set Identifier (SSID) SSID-A and AP4 defines another network segment identified as SSID-C. A network segment can span APs that are connected to different VTEPs; AP2 and AP3, for example, define such a network segment identified as SSID-B.

Figure 1C:
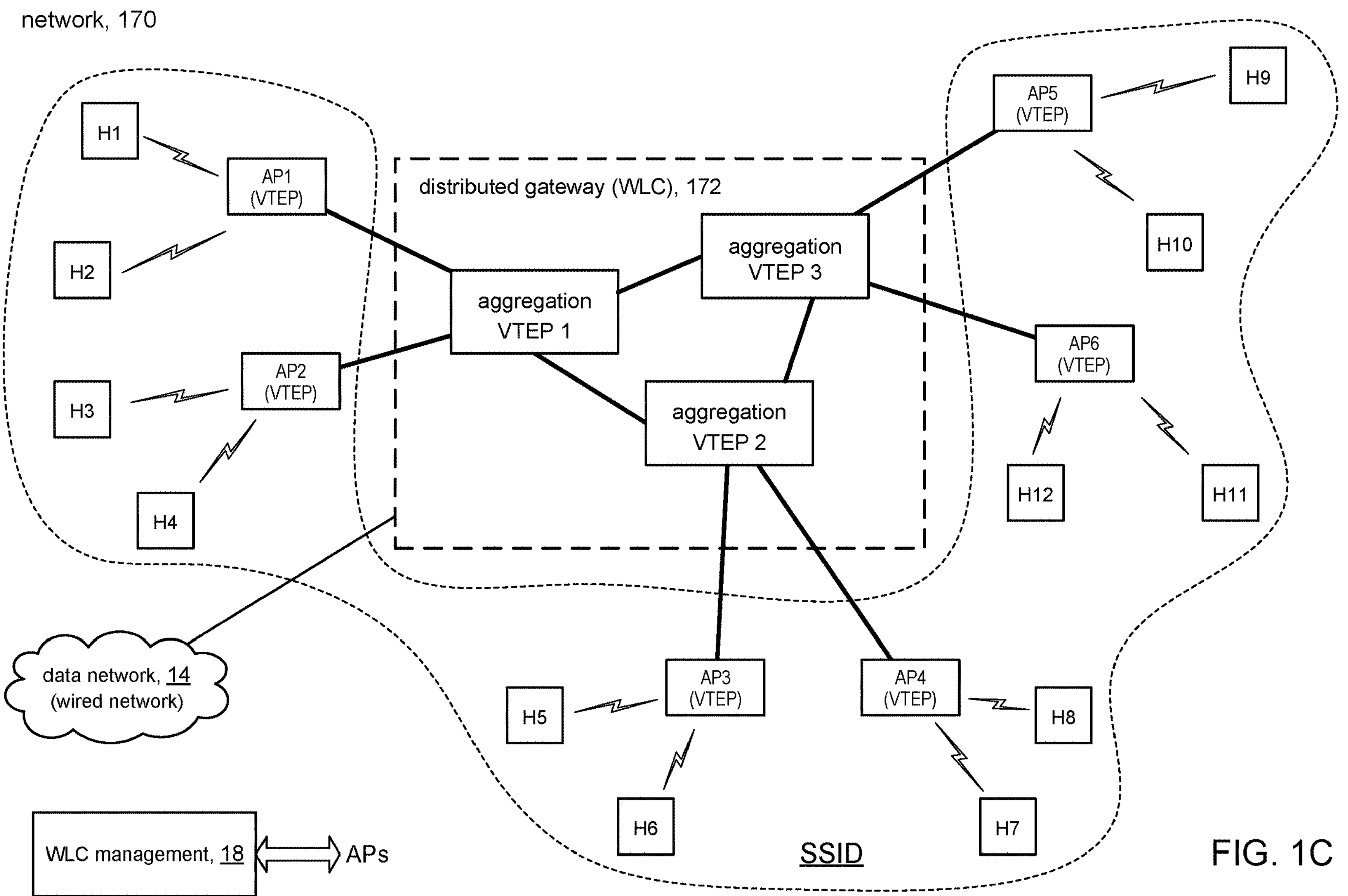
FIG. 1C shows a distributed gateway with a single network segment.

When a network segment spans multiple aggregation VTEPs, those VTEPs together can be referred to as a "distributed gateway" for hosts associated with that network segment. Consider the network segment SSID-B, for example. SSID-B spans VTEP 1 and VTEP 2 because it includes AP2, which is connected to VTEP 1, and AP3, which is connected to VTEP 2. Accordingly, VTEP 1 and VTEP 2 can function as a distributed gateway for hosts associated with SSID-B. Referring for a moment to FIG. 1C, network 170 shows a larger collection of VTEPs configured as distributed gateway 172 in accordance with the present disclosure. The example shows a network segment that includes AP1 to AP6. The respective VTEPs to which the APs are connected, namely VTEP 1, VTEP 2, VTEP 3, collectively constitute distributed gateway 172. The collection of VTEPs functionally represents a gateway to data network 14 for devices (hosts, APs) connected to the VTEPs. The gateway is "distributed" in that each VTEP can provide access to data network 14, independently of the other VTEPs. The gateway functionality is distributed among the VTEPs rather than being centralized in a single device. The configuration shown in FIG. 1C represent an example of a WLC whose gateway functionality is provided by gateway 172 and whose AP control and management functions are provided by WLC management module 18.

Returning to FIG. 1B, each network segment 156 represents a subset of the network, and includes all devices that can reach one another at Layer 2 (L2) of the OSI (Open Systems Interconnection) model (i.e., devices that can reach one another via bridging). Accordingly, each network segment 156 can be referred to as a broadcast (communication) domain or an L2 domain. Generally, a broadcast domain refers to a group of devices that can reach each other at Layer 2 of the OSI model that belong to the same network segment.

Figure 2:
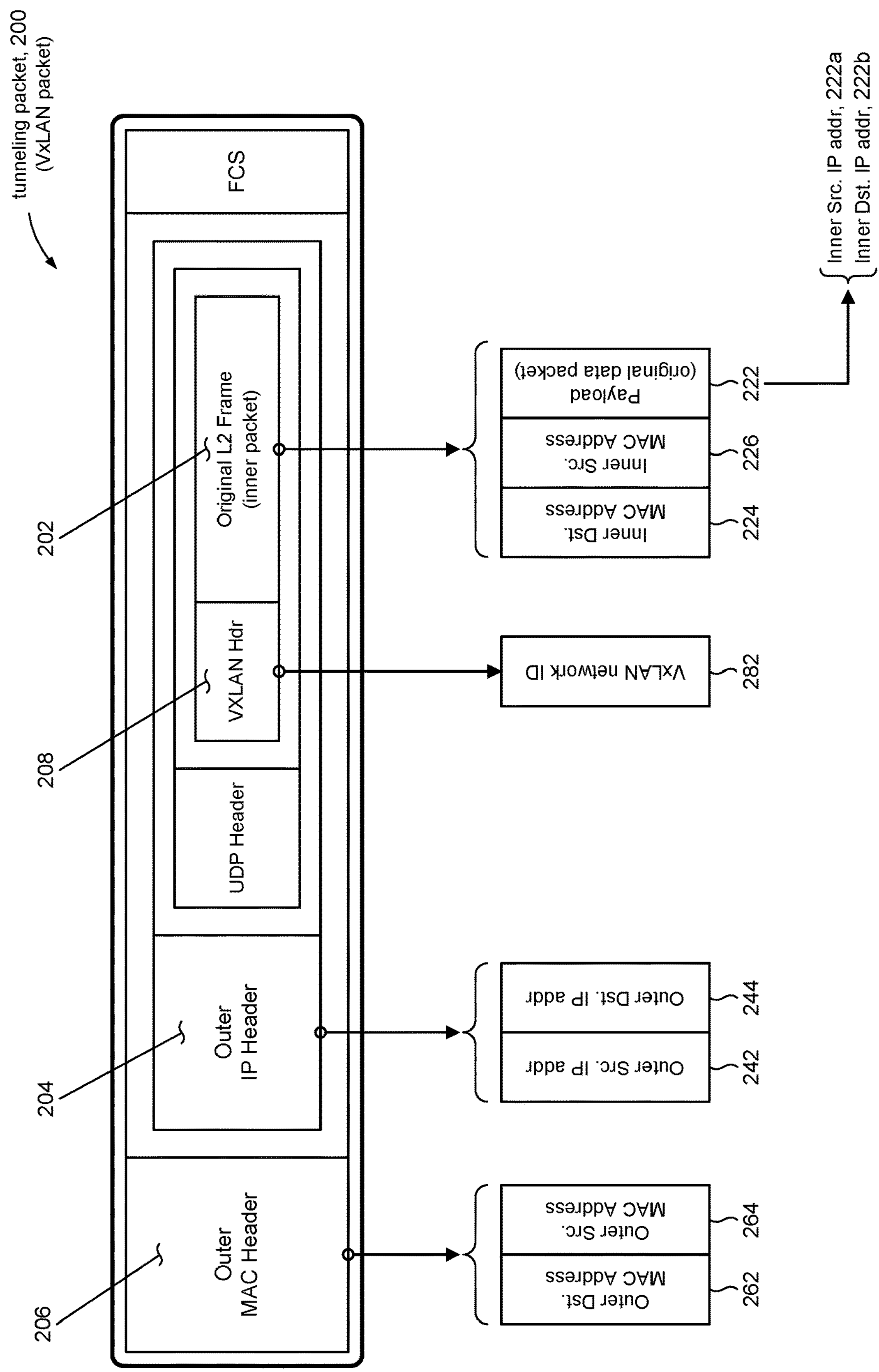
FIG. 2 shows details of a VxLAN packet.

Referring to FIG. 2, an anatomy of VxLAN tunneling packet 200 in accordance with the VxLAN protocol is shown. The VxLAN protocol is a well understood and standardized protocol. For purposes of the present disclosure, only certain fields of VxLAN packet 200 are highlighted. Beginning from the interior of VxLAN packet 200, data field 202 is the payload (inner packet) of the VxLAN packet. Data field 202 is an L2 frame (e.g., an Ethernet frame) that represents the network data from the sending VTEP. Data field 202 contains payload 222, which is the actual data packet of interest (e.g., data from one host to another host). Payload 222 will include Inner Source and Destination Internet protocol (IP) addresses 222*a*, 222*b*, which are the respective IP addresses of the source host and the destination host. Data field 202 also includes Inner Source media access control (MAC) address 226 and Inner Destination MAC address 224. The Inner Source MAC address is the MAC address of the sending host, and the Inner Destination MAC address is the MAC address of the destination host.

Data field 204 is an Outer IP Header of VxLAN packet 200 that includes Outer Source IP address 242, which is the IP address of the source VTEP that sends the tunneled packet, and Outer Destination IP address 244, which is the IP address of the destination VTEP that receives the VxLAN packet.

Data field 206 is an Outer Ethernet Header of the VxLAN packet that includes Outer Source MAC address 262 and Outer Destination MAC address 264. The Outer Source MAC address is the MAC address of the VTEP (e.g., an edge TE or another core TE) connected to the core TE. The Outer Destination MAC address is the MAC address of the destination VTEP (e.g., the destination core TE).

Data field 208 is a VxLAN header that, together with the original L2 frame (inner packet), goes in the UDP payload. The VxLAN header includes VxLAN network identifier (VNI) 282 which is a 24-bit quantity that identifies an L2 domain. An aggregation VTEP can support communication over multiple L2 domains. Aggregation VTEP 2 in FIG. 1B, for example, supports communication for L2 domain SSID-B and another separate L2 domain SSID-C. The VxLAN header identifies which L2 domain is associated with a given VxLAN packet.

To illustrate an example of processing a VxLAN packet in accordance with the present disclosure, consider host H5 and AP3 in FIG. 1B. Suppose host H5 wants to send a packet (original packet) to another host (e.g., host H3) on the network. The process begins with Host H5 transmitting the original packet to AP3. AP3 will transmit a VxLAN packet that encapsulates the original packet to aggregation VTEP 2. The VxLAN packet from AP3 to VTEP 2 will include the following information:

- Outer Source MAC address, 264—MAC address of AP3 (source of the VxLAN packet)
- Outer Destination MAC address, 262—MAC address of aggregation VTEP 2 (next hop in the underlay, and in this case a tunnel endpoint of the VxLAN packet)
- Outer Source IP address, 242—IP address of AP3
- Outer Destination IP address, 244—IP address of aggregation VTEP 2
- Inner Source MAC address, 226—MAC address of host H5 (source of the original packet)
- Inner Destination MAC address, 224—MAC address of host H3 (destination of the original packet)
- payload, 222—contains the original packet, which includes:
  - Inner Source IP address, 282—IP address of host H5 (source of the original packet)
  - Inner Destination IP address, 284—IP address of host H3 (destination of the original packet)

To illustrate a VTEP to VTEP bridging example, we will continue the above example with a description of how VTEP 2 processes the VxLAN packet from AP3. The process begins with VTEP 2 receiving the above-described VxLAN packet from AP3 over one tunnel. VTEP 2 performs the bridging operation by decapsulating the received VxLAN packet to recover the original packet and re-encapsulating the recovered original packet in a subsequent VxLAN packet that is then sent to VTEP 1 over another tunnel. The VxLAN packet from VTEP 2 to VTEP 1 will include the following information:

- Outer Source MAC address, 264—MAC address of VTEP 2 (source of the VxLAN packet)
- Outer Destination MAC address, 262—MAC address of VTEP 1 (next hop in the underlay, and in this case a tunnel endpoint of the VxLAN packet)
- Outer Source IP address, 242—IP address of VTEP 2
- Outer Destination IP address, 244—IP address of VTEP 1
- Inner Source MAC address, 226—MAC address of host H5 (source of the original packet).
- Inner Destination MAC address, 224—MAC address of host H3 (destination of the original packet)
- payload, 222—contains the original packet, which includes:
  - Inner Source IP address, 282—IP address of host H5 (source of the original packet)
  - Inner Destination IP address, 284—IP address of host H3 (destination of the original packet)

For the remaining discussion, and without loss of generality, reference will be made to the configuration shown in FIG. 1B in order to provide a specific example of core TEs 102 and edge TEs 104, namely aggregation VTEPs (or more simply VTEPs) and AP VTEPs (or more simply APs) respectively. It will be appreciated that the following description, although made in the context of VxLAN and VTEP technology, may be adaptable to other tunneling protocols and tunnel endpoints.

Figure 3:
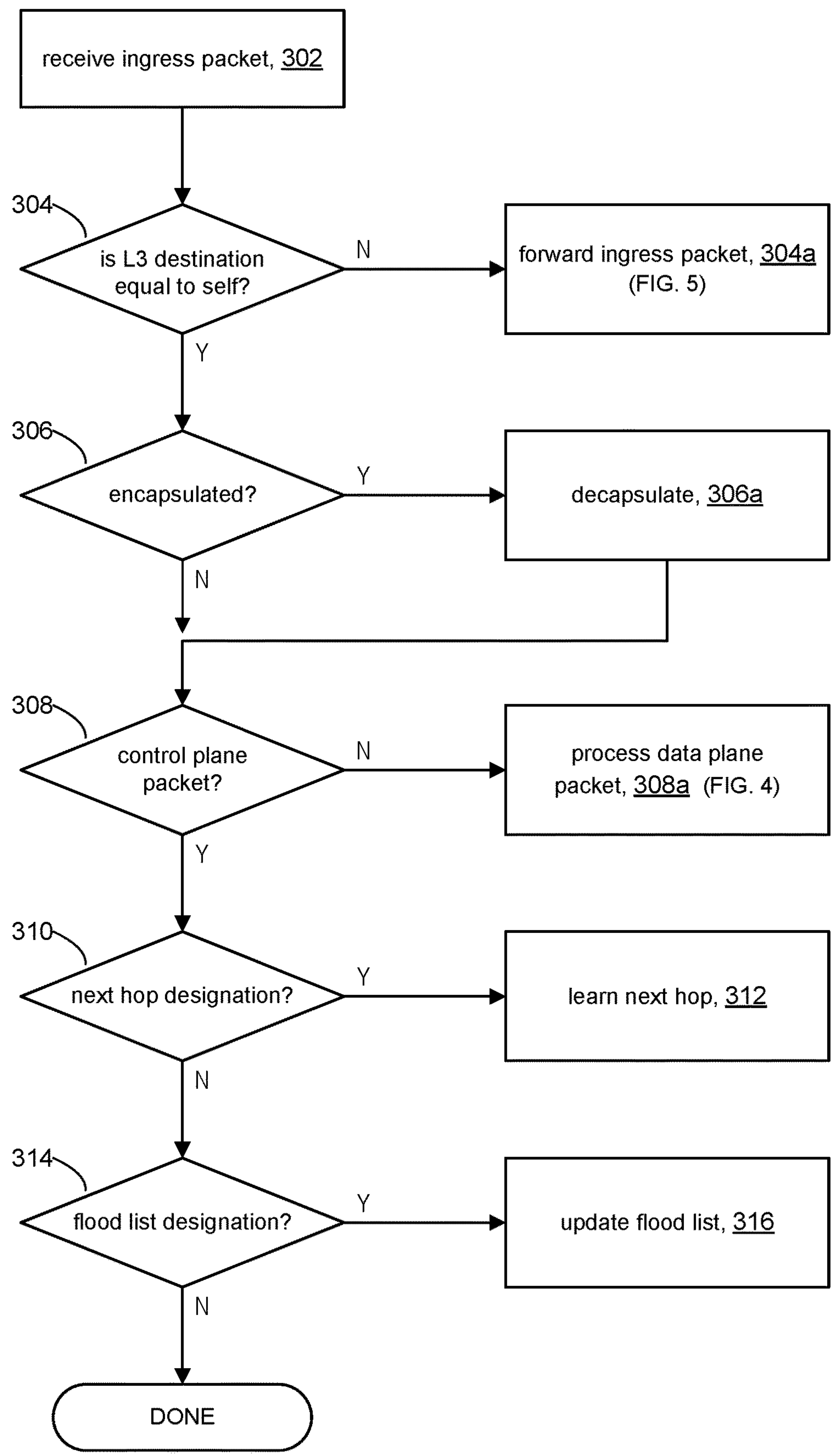
FIG. 3 shows processing a control plane packet in accordance with the present disclosure.

Referring to FIG. 3, the discussion will now turn to a high level description of processing in a core TE to process control plane packets in support of the functionality of a distributed gateway in accordance with the present disclosure. The description will refer to an aggregation VTEP (e.g., FIG. 1B) merely as an illustrative example. In some embodiments, for instance, the aggregation VTEP can include computer executable program code, which when executed by a processor (e.g., 808, FIG. 8), can cause the processor to perform operations in accordance with FIG. 3.

At operation 302, the aggregation VTEP can receive an ingress packet on one of its ports. The ingress packet can be encapsulated (e.g., a VxLAN packet) or not encapsulated.

At decision point 304, if the received ingress packet is destined for the aggregation VTEP, then processing in the aggregation VTEP can proceed to decision point 306. If the destination of the received ingress packet is not the aggregation VTEP, then processing in the aggregation VTEP can proceed to operation 304*a* to forward the ingress packet, details of which are described in connection with FIG. 5. In some embodiments, the destination IP address can be used to determine if the ingress packet is destined for the aggregation VTEP, for example, by comparing the destination IP in the ingress packet to the IP address of the aggregation VTEP. In the case of a tunneled (e.g., VxLAN) packet, the determination can be based on the inner destination IP address (222*b*, FIG. 2).

At decision point 306, if the received ingress packet is not encapsulated in a tunnel packet, then processing in the aggregation VTEP can proceed to decision point 308. If the received ingress packet is encapsulated (e.g., a VxLAN packet), then processing in the aggregation VTEP can proceed to operation 306*a*, where the aggregation VTEP can decapsulate the ingress packet to recover the inner packet, before proceeding to decision point 308; for discussion purposes, the recovered inner packet will continue to be referred to as the "ingress packet."

At decision point 308, if the ingress packet is a control plane packet then processing in the aggregation VTEP can proceed to decision point 310. If the ingress packet is not a control plane packet then the ingress packet can be deemed to be a data plane packet; processing in the aggregation VTEP can proceed to operation 308*a* to process a data plane packet, details of which are described in connection with FIG. 4. In some embodiments, for instance, the aggregation VTEPs can use Ethernet virtual private network (EVPN), a known technology for Layer 2 internetworking. EVPN defines network layer reachability information (NLRI) by extending the Border Gateway Protocol (BGP). In the context of BGP, the presence of a BGP header in the ingress packet can mean that the ingress packet is a control plane packet.

At decision point 310, if the ingress packet designates a next hop, then processing in the aggregation VTEP can proceed to operation 312. If the ingress packet does not designate a next hop, then processing in the aggregation VTEP can proceed to decision point 314. Using BGP as an example, the Address Family Identifier (AFI) and Subsequent Address Family Identifier (SAFI) data fields in the ingress (control plane) packet can be used to determine if we have an EVPN route. If the route type in the BGP EVPN NLRI is Type 2 (reference operation 412, FIG. 4), then we have a MAC-IP route and the ingress packet includes MAC reachability information (i.e., designates a next hop) that specifies the MAC address of a given host. Reference operation 416 in FIG. 4

At operation 312, the aggregation VTEP can learn the next hop that is contained in the ingress packet. In some embodiments, for example, the aggregation VTEP can include a forwarding database (FDB) that contains information to facilitate the forwarding of packets through the VTEP. FDBs are known data structures in a network device and are used to identify a next hop for a given packet. Using the MAC reachability information contained in the ingress packet, the aggregation VTEP can store an entry, in its FDB, that provides a mapping between the MAC address of the given host and the IP address of the sender (e.g., a VTEP) of the ingress packet. The mapping informs the aggregation VTEP that the IP address is the next hop for a packet destined for the given host. This aspect of the present disclosure is referenced below in connection with FIG. 5. Processing of the ingress packet can be deemed complete.

At decision point 314, if the ingress packet designates a flood list, then processing in the aggregation VTEP can proceed to operation 316. If the received ingress packet does not designate a flood list, then processing of the received ingress packet can be deemed complete. Flood lists are known. Certain packets, referred to as broadcast, unicast unknown, or multicast (BUM) packets, are broadcast to multiple destinations rather than to a single destination. The flood list informs the network device (e.g., the aggregation VTEP) the list of devices to which such packets are broadcast for a particular broadcast domain. Referring to the BGP example, for instance, if the route type in the BGP EVPN NLRI is Type 3 (reference operation 422, FIG. 4), then we have an Inclusive Multicast Ethernet Tag (IMET) route and the ingress packet contains flood list information; processing can proceed to operation 316.

At operation 316, when the ingress packet designates a flood list, the aggregation VTEP can update its flood list for that broadcast domain to include the VTEP that sent the ingress packet (sending VTEP). In some embodiments, for example, the IP address of the sending VTEP can be obtained from the received BGP EVPN IMET route. The IP address of the sending VTEP can be added to the aggregation VTEP's flood list for that broadcast domain so that BUM traffic is broadcast to the sending VTEP along with other neighbors in the flood list. This aspect of the present disclosure is referenced below in connection with FIG. 5. Processing of an ingress packet received from an aggregation VTEP can be deemed complete.

Figure 4:
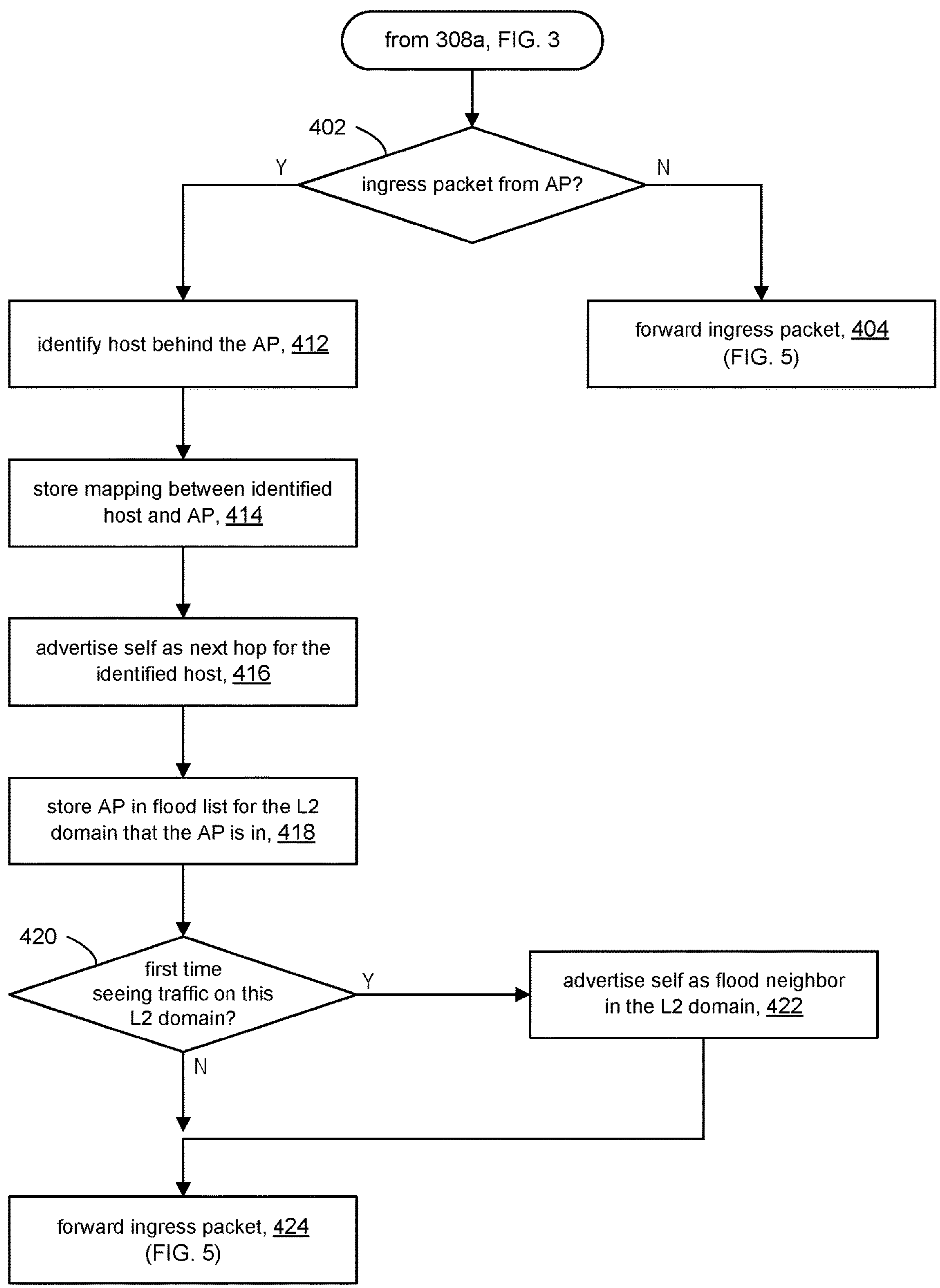
FIG. 4 shows processing a data plane packet in accordance with the present disclosure.

Referring to FIG. 4, the discussion will now turn to a high level description of processing in a core TE to process data plane packets in support of the functionality of a distributed gateway in accordance with the present disclosure. The description will refer to an aggregation VTEP as a specific example. In some embodiments, for instance, the aggregation VTEP can include computer executable program code, which when executed by a processor (e.g., 808, FIG. 8), can cause the processor to perform operations in accordance with FIG. 4. The operations shown in FIG. 4 continue from operation 308*a* in FIG. 3.

At decision point 402, if the ingress packet comes from an AP, then processing in the aggregation VTEP can proceed according to operation 412. If the ingress packet does not come from an AP, then the aggregation VTEP can proceed operation 404 to forward the ingress packet, details of which are described in connection with FIG. 5. In some embodiments, for example, the outer source IP address (e.g., 242, FIG. 2) contained in the encapsulated form of ingress packet can be used to determine whether the ingress packet comes from an AP or a non-AP device.

At operation 412, the aggregation VTEP can identify the host behind the AP that sent the ingress packet. In some embodiments, for example, the AP can be identified by its outer source MAC address (e.g., 264, FIG. 2) or its outer source IP address (e.g., 244) contained in the encapsulated form of the ingress packet. Similarly, the host can be identified by its inner source MAC address (e.g., 226) or its inner source IP address (e.g., 222*a*) contained in the encapsulated ingress packet.

At operation 414, the aggregation VTEP can store or otherwise learn a mapping between the identified AP and the identified host. The aggregation VTEP can install an entry in the FDB that maps between the identified AP and the identified host. In some embodiments, for example, the MAC address of the identified AP and the MAC address of the identified host can be installed in the FDB. As will be explained in connection with FIG. 5, this mapping allows the aggregation VTEP to select the identified AP as the next hop for the identified host.

At operation 416, the aggregation VTEP can advertise itself to the other aggregation VTEPs to inform the other aggregation VTEPs that it is the next hop for the identified host. Accordingly, the aggregation VTEP can advertise a BGP EVPN MAC-IP route (Type 2 route) to the other aggregation VTEPs to inform the other aggregation VTEPs that it is the next hop for the identified host. See decision point 310 in FIG. 3 for the processing of the BGP EVPN MAC-IP route.

At operation 418, the aggregation VTEP can store the AP in its flood list for the broadcast domain that includes the AP. The flood list informs the network device (e.g., the aggregation VTEP) the list of devices to which BUM packets are broadcast As explained above, a broadcast domain (also referred to as an L2 domain) is a subset of a network that includes all devices that can reach one another at Layer 2 of the OSI model. In some embodiments, the aggregation VTEP can maintain a flood list for each broadcast domain with which it is currently configured. Referring to FIG. 1B, for instance, aggregation VTEP 2 shows at least three broadcast domains: the broadcast domain identified by SSID-B, the domain identified by SSID-C, and so on. A given flood list contains a list of the devices in the corresponding broadcast domain learned by the aggregation VTEP. In some embodiments, the aggregation VTEP can use the VNI (e.g., 282, FIG. 2) contained in the received ingress packet to identify the corresponding local VLAN on the VTEP. The identified local VLAN represents the broadcast domain. The AP (e.g., its MAC address) can be added to the flood list of the aggregation VTEP that is associated with the identified broadcast domain.

At decision point 420, if the aggregation VTEP is seeing traffic on the broadcast (L2) domain identified at operation 418 for the first time, then processing in the aggregation VTEP can proceed to operation 422. If the aggregation VTEP has previously seen traffic on the broadcast (L2) domain identified at operation 418, then processing in the aggregation VTEP can proceed to operation 424 to forward the ingress packet in accordance with the operations shown in FIG. 5. In some embodiments, for example, the flood list associated with each broadcast domain defined in the aggregation VTEP can include an associated flag that is set or not set to indicate whether traffic on that broadcast domain has been previously detected.

At operation 422, the aggregation VTEP can advertise itself to the other VTEPs in the VxLAN control plane (FIG. 1B) to inform those devices that it is a flood neighbor of the broadcast domain that includes the AP identified at operation 312. In some embodiments, for example, the aggregation VTEP can advertise a BGP EVPN IMET route (Type 3 route) to the other devices to indicate its participation in the flood list for the identified broadcast domain. See decision point 314 in FIG. 3 for the processing of the BGP EVPN IMET route.

Figure 5:
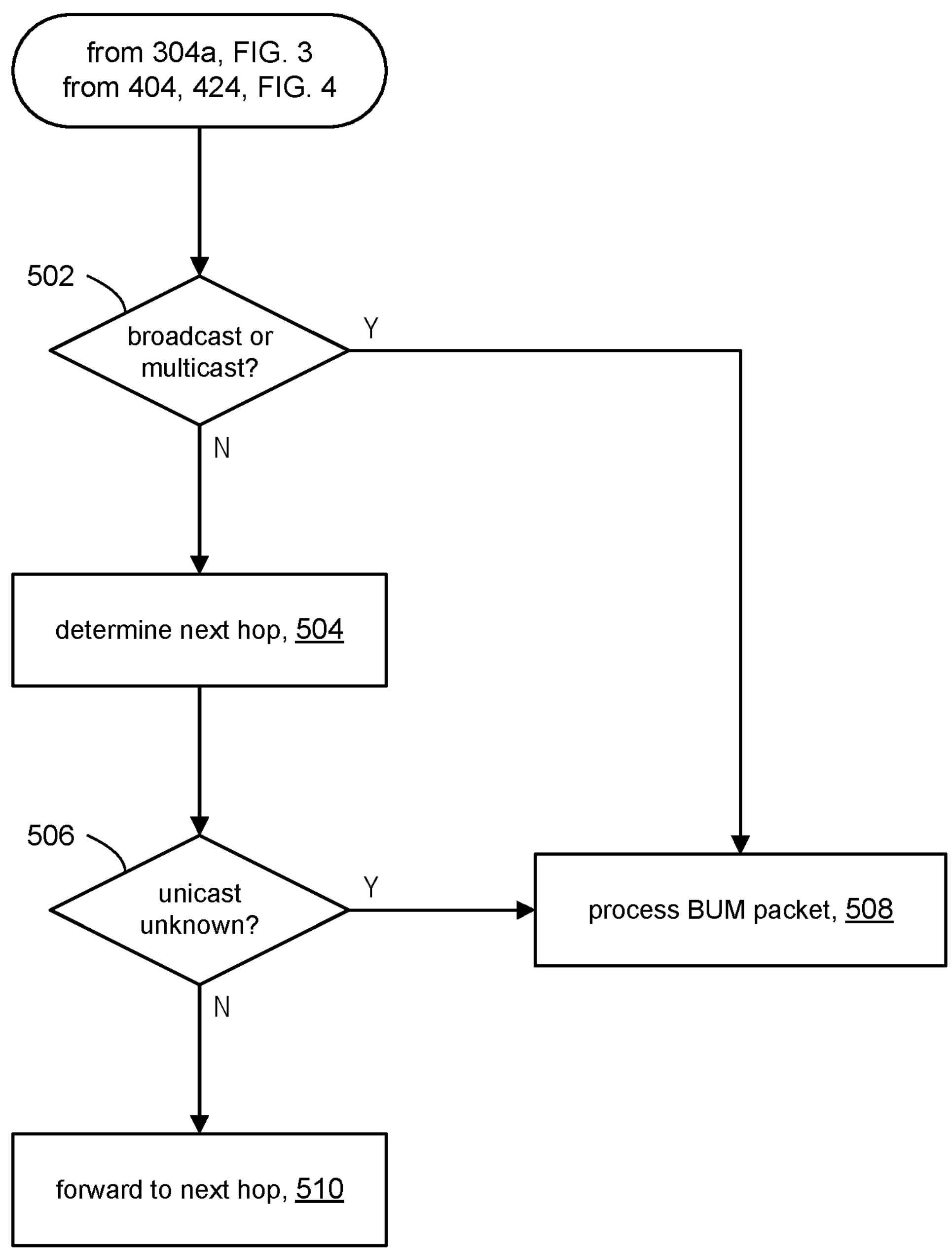
FIG. 5 shows forwarding an ingress packet in accordance with the present disclosure.

At operation 424, the aggregation VTEP can forward the ingress packet, details of which are described in FIG. 5.

Referring to FIG. 5, the discussion will now turn to a high level description of processing in a core TE to support forwarding of data plane packets in a distributed gateway in accordance with the present disclosure. The description will refer to an aggregation VTEP as a specific example. In some embodiments, for instance, the aggregation VTEP can include computer executable program code, which when executed by a processor (e.g., 808, FIG. 8), can cause the processor to perform operations in accordance with FIG. 5. The operations in FIG. 5 continue from operation 304*a* in FIG. 3 and operations 404, 424 in FIG. 4.

At decision point 502, if the received ingress packet is a broadcast packet or a multicast packet, then processing in the aggregation VTEP can proceed to operation 508 to handle broadcast and multicast packets in accordance with the present disclosure. If the received ingress packet is neither a broadcast packet nor a multicast packet, then processing in the aggregation VTEP can proceed to operation 504. In some embodiments, this determination can be made based on the inner packet of the received ingress packet.

Broadcast Packet—In some embodiments, the aggregation VTEP can determine that the recovered inner packet is a broadcast packet based on its destination MAC address. Referring to the VxLAN packet shown in FIG. 2, for example, a broadcast packet can be detected based on the inner destination MAC address (224) contained in the inner packet. A broadcast packet is intended to target all nodes on the network, and can be identified by a destination MAC address that contains all l's, namely:

FF: FF: FF: FF: FF: FF.

Multicast Packet—Similarly, in some embodiments, the aggregation VTEP can determine that the recovered inner packet is a multicast packet based on its inner destination MAC address (224). A multicast packet can be identified when the least significant bit in the first octet of the MAC address is set to '1'; for example:

bbbbbbb1:xx:xx:xx:xx:xx, where, b is '0' or '1' and x is 0–F.

At operation 504 the aggregation VTEP can determine a next hop destination to which the inner packet can be forwarded. In some embodiments, for example, the aggregation VTEP can determine the next hop from its FDB using the inner destination MAC address contained in the inner packet. The FDB may include destination MAC address-to-next hop mappings that were learned (312, FIG. 3) from previously advertised BGP EVPN MAC-IP routes (416, FIG. 4).

At decision point 506, if the aggregation VTEP's FDB does not map the destination MAC address of the inner packet to a next hop, the inner packet can be deemed to be an "unknown unicast" packet and processing in the aggregation VTEP can proceed to operation 508 to process an unknown unicast packet in accordance with the present disclosure. If the FDB maps the destination MAC to a next hop, then processing in the aggregation VTEP can proceed to operation 510.

At operation 508, the aggregation VTEP can process a Broadcast, Unknown Unicast, and Multicast (BUM) packet in accordance with the present disclosure. The aggregation VTEP can identify and access an appropriate flood list to identify flood neighbors. In the case of a VxLAN packet, for example, the flood list can be identified based on the VNI in the VxLAN header in the BUM packet. The VNI can be used to do a lookup on the local VNI-to-VLAN mapping in the aggregation VTEP to identify the ID of the VLAN. In the case of a non-VxLAN packet, we look for a VLAN (802.1Q) header in the packet or at the VLAN associated with the ingress interface to obtain the VLAN ID. In all cases, the VLAN ID is representative of the broadcast domain on which to flood the packet. Neighbors in the flood list can include front panel ports of the aggregation VTEP and other VTEPs in the network, including aggregation VTEPs identified in previously advertised BGP EVPN IMET routes (422, FIG. 4). The aggregation VTEP can forward one copy of the inner packet to each neighbor specified in the identified flood list. Processing of the received ingress packet by the aggregation VTEP can be deemed complete.

At operation 510, the aggregation VTEP can forward the inner packet to the next hop. If the next hop is a VTEP, then the aggregation VTEP can encapsulate the inner packet to produce an egress VxLAN packet that can then be forwarded on the tunnel associated with the destination VTEP. Processing of the received ingress packet by the aggregation VTEP can be deemed complete.

The discussion will now turn to illustrative traffic flow examples to provide context for the operations shown in FIGS. 3, 4, and 5. The examples will be illustrated using a VxLAN configured network.

Figure 6A:
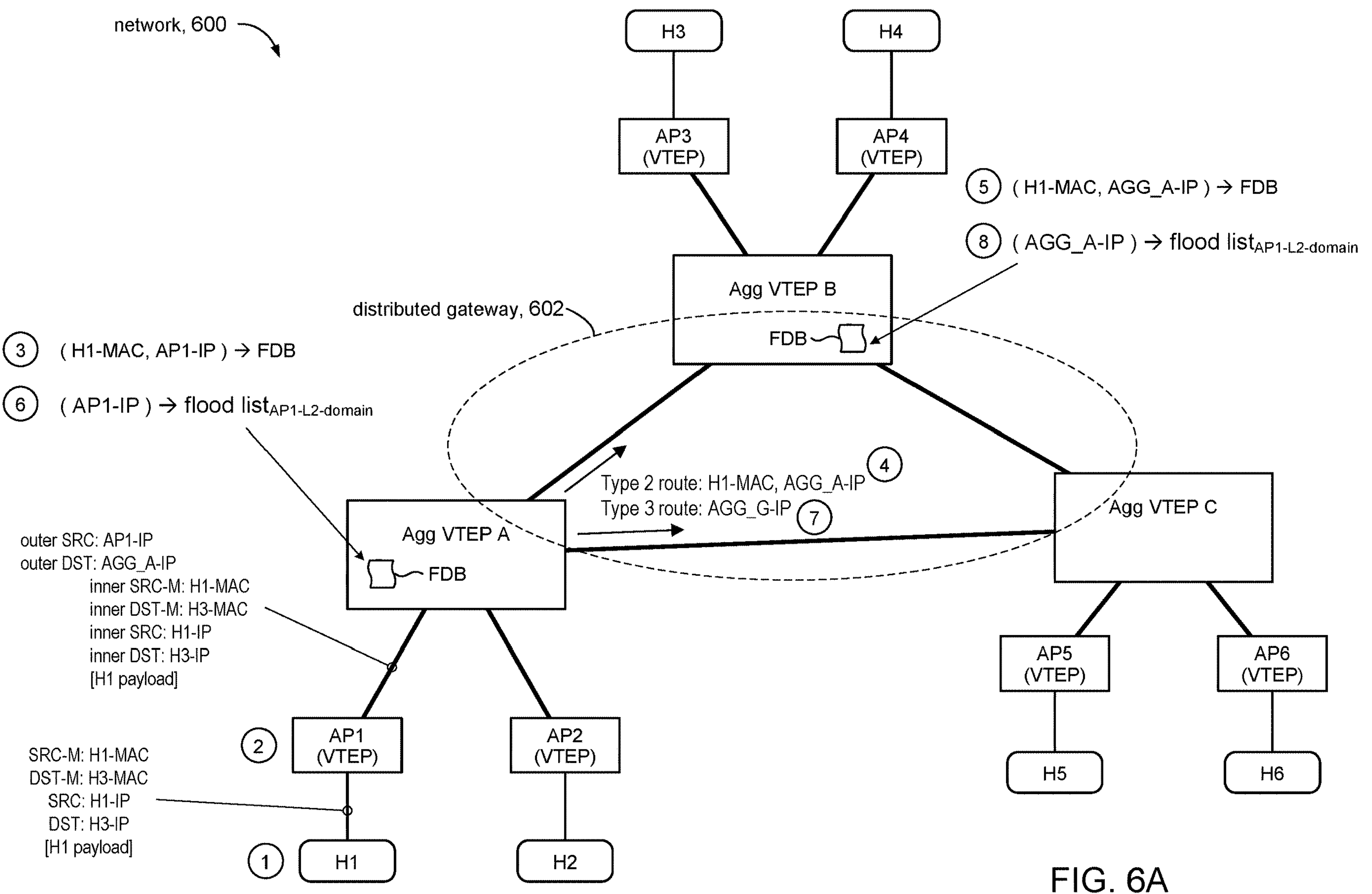
FIGS. 6A and 6B show illustrative examples of traffic flows in accordance with the present disclosure.

Referring to FIG. 6A, network 600 includes distributed gateway 602 comprising aggregation VTEPs A, B, and C, and access point VTEPs AP1 to AP6 connected to their respective aggregation VTEPs. The APs provide wireless access for their respective associated hosts H1 to H6. For discussion purposes, AP1 and AP3 are in the same network segment. We consider a packet sent from host H1 to host H3. FIG. 6A shows traffic flow when processing a packet sent from host H1 to host H3 in accordance with operations shown in FIGS. 3 and 4. The processing is described in terms of a series of actions identified by time indices that are represented in the figure as circled numerals. The time indices provide a general order of the sequencing of actions. It is understood that the actual order in which the actions are performed will depend on particular embodiments of the present disclosure. References to operations in FIGS. 3 and 4 are made when appropriate. References to aggregation VTEPs A, B, and C are shortened to VTEPs A, B, and C.

At time index 1, host H1 transmits a (original) packet to AP1 with the following address information:

SRC-M: H1-MAC
DST-M: H3-MAC
SRC: H1-IP
DST: H3-IP
[H1 PAYLOAD]

At time index 2, AP1 encapsulates the original packet in a VxLAN packet and forwards the VxLAN packet to VTEP A with the following IP address information:

OUTER SRC: AP1-IP
OUTER DST: AGG_A-IP
INNER SRC-M: H1-MAC
INNER DST-M: H3-MAC
INNER SRC: H1-IP
INNER DST: H3-IP
[H1 PAYLOAD]

Aggregation VTEP A receives the VxLAN packet from AP1 (operation 302) and decapsulates the received VxLAN packet to recover the inner original packet (operation 306*a*). It can be appreciated that processing will proceed to FIG. 4 via operation 308*a*.

At time index 3, VTEP A identifies the host behind AP1 (operation 412), which is host H1, and learns the mapping between host H1 and AP1 (operation 414). The mapping maps the MAC address of host H1 and the IP address of AP1, and is installed in the FDB of VTEP A.

At time index 4, VTEP A advertises an EVPN Type 2 (MAC-IP) route to the other aggregation VTEPs in network 600 (operation 416). The Type 2 route serves to inform the other aggregation VTEPs that VTEP A is the next hop for packets destined to host H1.

At time index 5, the other aggregation VTEPs comprising distributed gateway 602 receive and process the Type 2 route in accordance with the present disclosure. Consider VTEP B, for example, where the VTEP learns the host H1 to VTEP A mapping in its FDB (operation 312). Although not shown, VTEP C also installs the host H1 to VTEP A mapping in its FDB.

At time index 6, VTEP A adds AP1 to a flood list stored in VTEP A that is associated with the broadcast domain that includes AP1 (operation 418). The flood list will inform VTEP A to include AP1 as a flood neighbor when broadcasting BUM packets to that broadcast domain.

At time index 7, VTEP A advertises an EVPN Type 3 (IMET) route to the other aggregation VTEPs in network 600, if this is the first time seeing traffic in the broadcast domain of AP1 (operation 422). The Type 3 route serves to inform the other aggregation VTEPs to include VTEP A in their respective flood lists.

At time index 8, each aggregation VTEP processes the Type 3 route in accordance with the present disclosure. Consider VTEP B, for example, where VTEP B adds VTEP A to its flood list (operation 316) for that broadcast domain. Although not shown, VTEP C also adds VTEP A to its flood list for that broadcast domain.

Figure 6B:
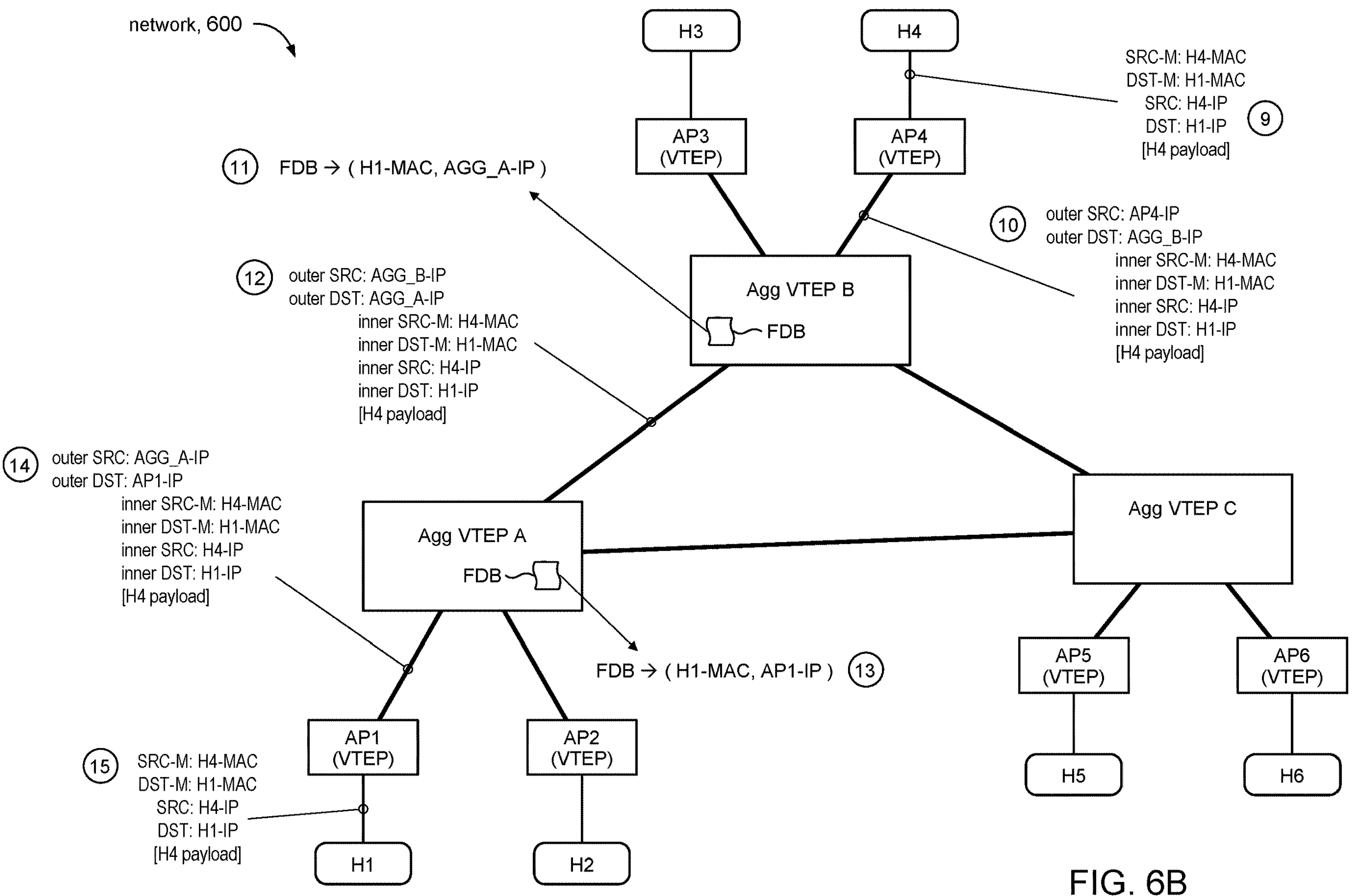

FIG. 6B continues the example of FIG. 6A and shows traffic flow when processing a packet sent from host H4 to host H1. FIG. 6B shows traffic flow when processing a packet sent from host H4 to host H1 in accordance with operations shown in FIG. 5, for the case where the packet is not a BUM packet; FIG. 6C describes processing for a BUM packet. It will be understood that VTEP B will perform processing per FIGS. 3 and 4 as described above in FIG. 6A, but those operations are omitted in order to focus on operations in FIG. 5. The discussion continues from the point of view of VTEP B beginning at a time subsequent to time index 8. It is understood that the actual order in which the actions are performed will depend on particular embodiments of the present disclosure. References to operations in FIG. 5 are made when appropriate. References to aggregation VTEPs A, B, and C are shortened to VTEPs A, B, and C.

At time index 9, host H4 transmits a (original) packet to AP4 with the following address information:

SRC-M: H4-MAC
DST-M: H1-MAC
SRC: H4-IP
DST: H1-IP
[H4 PAYLOAD]

At time index 10, AP4 encapsulates the original packet in a VxLAN packet and forwards the VxLAN packet to VTEP B with the following IP address information:

OUTER SRC: AP4-IP
OUTER DST: AGG_B-IP
INNER SRC-M: H4-MAC
INNER DST-M: H1-MAC
INNER SRC: H4-IP
INNER DST: H1-IP
[H4 PAYLOAD]

At time index 11, VTEP B receives the VxLAN packet from AP4 and decapsulates the received VxLAN packet to recover the inner original packet and will proceed to FIG. 5 via operation 424. Because the destination MAC address in the recovered inner packet is neither a broadcast address nor a multicast address (N branch of decision point 502), VTEP B performs a lookup in its FDB to identify a next hop for the recovered inner packet (operation 504).

At time index 12, because VTEP B learned of the host H1-to-VTEP A mapping at time index 5 in FIG. 6A, VTEP B finds that the next hop for the recovered inner packet is VTEP A; the recovered inner packet is a known unicast packet (N branch of decision point 506). Accordingly, VTEP B encapsulates the inner packet in a VxLAN egress packet and forwards the egress packet to VTEP A (operation 510). Processing of the recovered inner packet by VTEP B can be deemed complete.

At time index 13, VTEP A decapsulates the VxLAN packet received from VTEP B to recover the inner packet and will proceed to FIG. 5 via operation 404. Because the destination MAC address in the recovered inner packet is neither a broadcast address nor a multicast address, VTEP A performs a lookup in its FDB to identify a next hop for the recovered inner packet (operation 504).

At time index 14, because VTEP A learned of the H1-to-AP1 mapping at time index 3 in FIG. 6A, VTEP A finds that the next hop is AP1. Accordingly, VTEP A encapsulates the inner packet in a VxLAN egress packet and forwards the egress packet to AP1 (operation 510). Processing of the recovered inner packet by VTEP A can be deemed complete.

At time index 15, AP1 decapsulates the VxLAN packet received from VTEP A to recover the inner packet. AP1 forwards the inner packet to host H1, for example, based on the destination MAC address contained in the inner packet.

Figure 7:
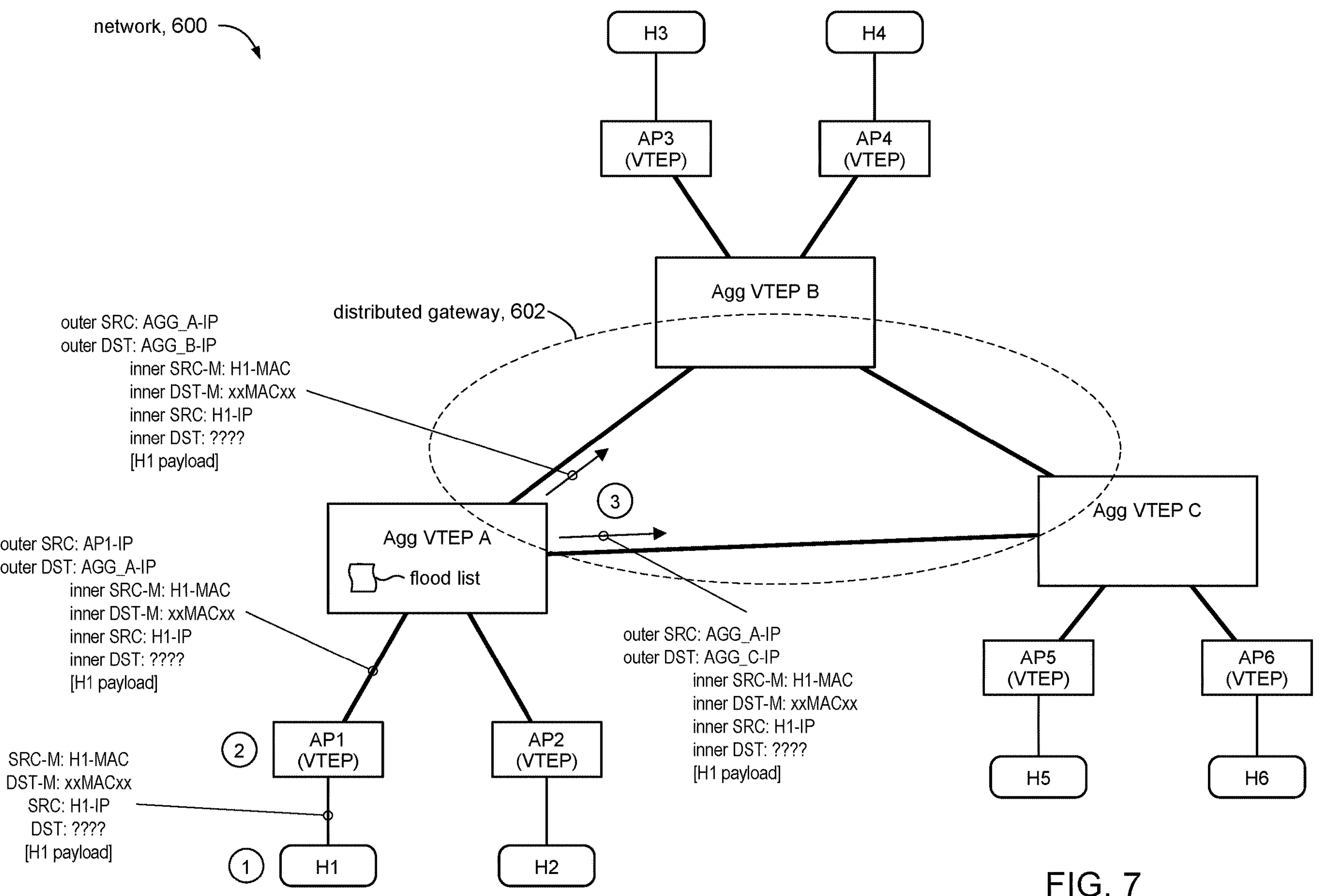
FIG. 7 illustrates an example of BUM traffic in accordance with the present disclosure.

Referring to FIG. 7 the discussion will turn to a description of processing BUM traffic in accordance with the flow shown in FIG. 5. FIG. 7 uses the configuration of FIG. 6A to illustrate traffic flow for the case where the packet from host H1 is a BUM packet.

At time index 1, host H1 transmits a packet to AP1 with the following address information:

SRC-M: H1-MAC
DST-M: xxMACXX
SRC: H1-IP
DST: ???
[H1 PAYLOAD]

where xxMACxx is a broadcast MAC address (FF:FF:FF:FF:FF:FF) or a multicast MAC address (bbbbbbb1:xx:xx:xx:xx:xx), or where the destination IP address is unknown.

At time index 2, AP1 encapsulates the original packet in a VxLAN packet and forwards the VxLAN packet to VTEP A with the following IP address information:

OUTER SRC: AP1-IP
OUTER DST: AGG_A-IP
INNER SRC-M: H1-MAC
INNER DST-M: XXMACXX
INNER SRC: H1-IP
INNER DST: ???
[H1 PAYLOAD]

Aggregation VTEP A receives the VxLAN packet from AP1 (operation 302) and decapsulates the received VxLAN packet to recover the inner original packet (operation 306*b*). The packet is processed in accordance with FIGS. 3 and 4 as described above in connection with FIG. 6A, where processing leads to FIG. 5.

At time index 3, VTEP A will detect a BUM packet, either at decision point 502 or decision point 506, and process the BUM packet at operation 508. More specifically, VTEP A will use the flood list associated with the L2 domain associated with the VNI in the VxLAN header, flood the packet to each neighbor in that flood list.

Figure 8:
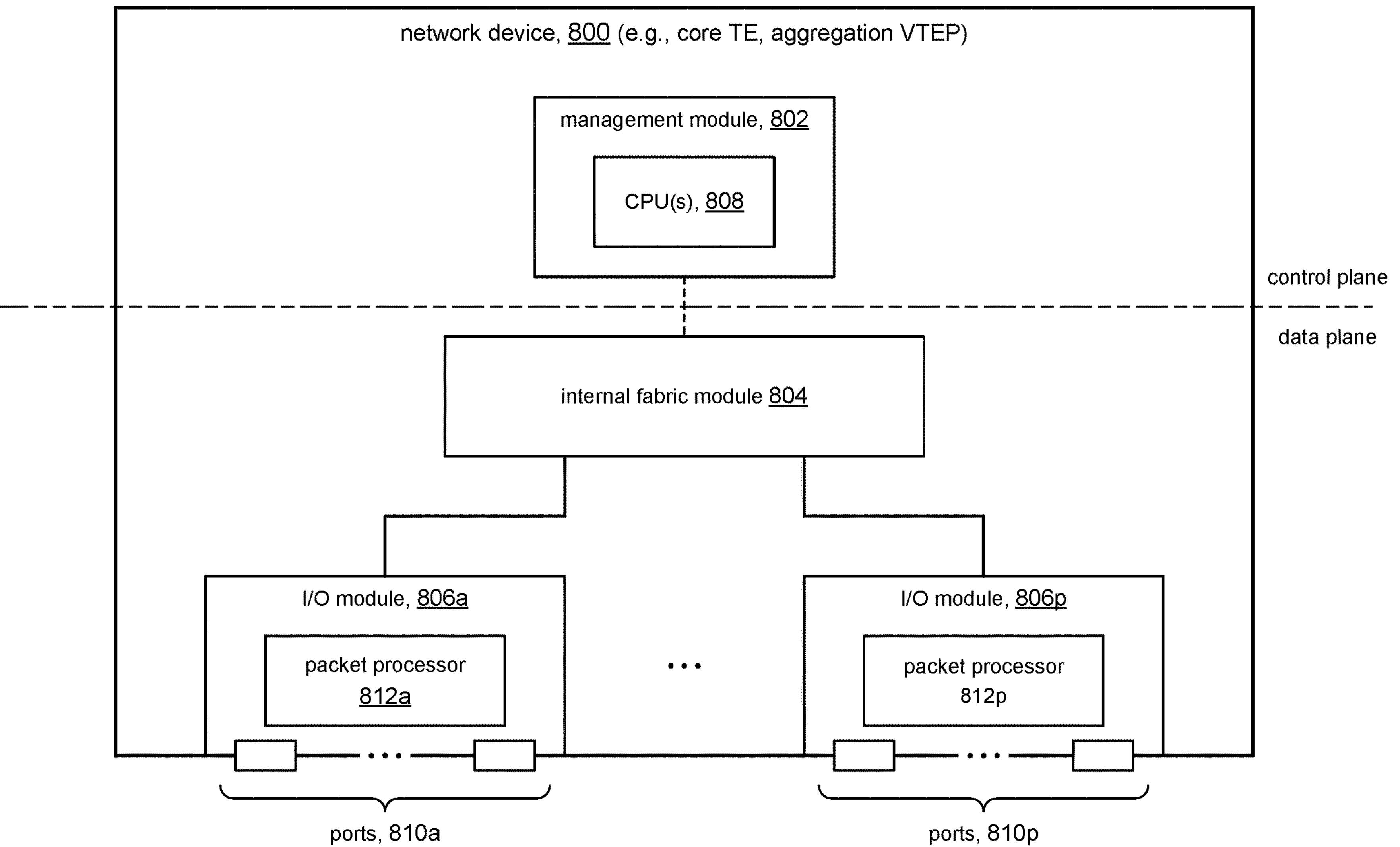
FIG. 8 shows network device that can be adapted to operate in accordance with the present disclosure.

Referring now to FIG. 8, we show an example of a network device in accordance with some embodiments of the present disclosure. In some embodiments, network device 800 can be a switch (e.g., core TE, FIG. 1A, VTEP A, FIG. 1B). As shown, network device 800 includes a management module 802, an internal fabric module 804, and a number of I/O modules 806*a*-806*p*. Management module 802 includes the control plane (also referred to as control layer) of network device 800 and can include one or more management CPUs 808 for managing and controlling operation of network device 800 in accordance with the present disclosure. Each management CPU 808 can be a general purpose processor, such as an Intel®/AMD® x86 or ARM® processor, that operates under the control of software stored in a memory (not shown), such as dynamic random access memory (DRAM). Control plane refers to all the functions and processes that determine which path to use, such as routing protocols, spanning tree, and the like.

Internal fabric module 804 and I/O modules 806*a*-806*p* collectively represent the data plane of network device 800 (also referred to as data layer, forwarding plane, etc.). Internal fabric module 804 is configured to interconnect the various other modules of network device 800. Each I/O module 806*a*-806*p* includes one or more input/output ports 810*a*-810*p* that are used by network device 800 to send and receive network packets. Each I/O module 806*a*-806*p* can also include a packet processor 812*a*-812*p*. Each packet processor 812*a*-812*p* can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

FURTHER EXAMPLES

In accordance with the present disclosure, a method in a network device comprises receiving a packet from an access point (AP) coupled to the network device, the received packet containing an inner packet sent to the AP from a host associated with the AP; identifying the associated host from the inner packet contained in the received packet; storing into a forwarding database of the network device an entry that represents a mapping between the identified associated host and the AP; advertising, to a plurality of network devices, a next hop message that represents a mapping between the identified associated host and the network device; and advertising, to the plurality of network devices, a participation message that indicates participation by the network device in flood lists that target a communication domain to which the AP belongs.

In some embodiments, the AP coupled to the network device and the APs coupled to the plurality of network devices define a network segment, wherein the network device receives packets from the network segment.

In some embodiments, the next hop message informs each of the plurality of network devices that the network device is a next hop for packets destined for the identified associated host.

In some embodiments, the participation message informs each network device in the plurality of network devices to include the network device in a flood list of said each network device in connection with processing a broadcast, unicast unknown, or multicast (BUM) packet.

In some embodiments, the method further comprises receiving a next hop message advertised by a second network device among the plurality of network devices, the received next hop message identifying a remote host, wherein the second network device is a next hop to reach the remote host; and storing an entry in the forwarding database of the network device that represents a mapping between the remote host and the second network device.

In some embodiments, the method further comprises the network device forwarding the received packet, including: identifying a second network device among the plurality of network devices as a next hop network device based on next hop messages previously advertised by the plurality of network devices; and forwarding the received packet to the identified next hop network device.

In accordance with the present disclosure, a network device comprises one or more computer processors; and a computer-readable storage medium that comprises instructions for controlling the one or more computer processors to: receive a first packet from an access point (AP), the first packet containing an inner packet that was sent to the AP from a host associated with the AP; store a mapping between the host and the AP; receive a second packet from a second network device among a plurality of network devices, wherein the second packet contains data that is destined for the host associated with the AP; and forwarding the received second packet to a next hop, wherein the next hop is identified using the stored mapping between the host and the AP.

In some embodiments, the second packet is sent from a host associated to a second AP coupled to the second network device, wherein the AP coupled to the network device and the second AP define a network segment.

In some embodiments, the computer-readable storage medium further comprises instructions for controlling the one or more computer processors to advertise a next hop message to the plurality of network devices that represents a mapping between the host and the network device, in response to receiving the first packet. In some embodiments, the next hop message informs the plurality of network devices that the network device is a next hop for packets destined for the host.

In some embodiments, the computer-readable storage medium further comprises instructions for controlling the one or more computer processors to: receive a next hop message from one of the plurality of network devices, the received next hop message including a mapping between a remote host and said one of the plurality of network devices, wherein said one of the plurality network devices is a next hop to reach the remote host; and store an entry in the forwarding database of the network device that represents the mapping between the remote host and said one of the plurality of network devices.

In some embodiments, the computer-readable storage medium further comprises instructions for controlling the one or more computer processors to: identify one of the plurality of network devices as a next hop based on next hop messages previously advertised by the network devices in the plurality of network devices and received by the network device; and forward an egress packet generated from the received packet to the identified next hop.

In some embodiments, the computer-readable storage medium further comprises instructions for controlling the one or more computer processors to advertise a participation message to the plurality of network devices, in response to receiving the first packet, the participation message indicating the network device's participation in flood lists that target a communication domain to which the AP belongs. In some embodiments, the participation message informs each network device in the plurality of network devices to include the network device in a flood list of said each network device in connection with processing a broadcast, unicast unknown, or multicast (BUM) packet. In some embodiments, the network device advertises the participation message in response to the first packet being a packet received from the communication domain for the first time.

In accordance with the present disclosure, a network device comprises one or more computer processors; and a computer-readable storage medium comprising instructions for controlling the one or more computer processors to: receive a packet from an access point (AP), the packet containing an inner packet sent to the AP from a host associated with the AP; and advertise, in response to receiving the packet from the AP, a participation message to a plurality of network devices that indicates participation by the network device in flood lists that target a communication domain to which the AP belongs.

In some embodiments, the AP coupled to the network device and the APs coupled to the plurality of network devices define a network segment.

In some embodiments, the computer-readable storage medium further comprises instructions for controlling the one or more computer processors to store the AP in a flood list of the network device associated with the communication domain to which the AP belongs.

In some embodiments, the participation message informs each network device in the plurality of network devices to include the network device in said each network device's respective flood lists for processing a broadcast, unicast unknown, or multicast (BUM) packet.

In some embodiments, the network device advertises the participation message in response to the received packet being a packet received from the communication domain for the first time.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a distributed gateway system comprising a plurality of network devices, the method comprising:

a first network device of the distributed gateway system receiving a packet from an access point (AP) coupled to the first network device, the received packet containing an inner packet sent to the AP from a host associated with the AP;

the first network device identifying the associated host from the inner packet contained in the received packet;

the first network device storing into a forwarding database of the first network device an entry that represents a mapping between the identified associated host and the AP;

the first network device advertising to other network devices of the distributed gateway system a next hop message that represents a mapping between the identified associated host and the first network device; and the first network device advertising to the other network devices of the distributed gateway system a participation message that indicates participation by the first network device in flood lists that target a communication domain to which the AP belongs.

2. The method of claim 1, wherein the distributed gateway system comprises a management computer separate from the plurality of network devices, the method further comprising the management computer configuring APs coupled to the plurality of network devices.

3. The method of claim 1, wherein the AP coupled to the first network device of the distributed gateway system and APs coupled to the other network devices of the distributed gateway system define a network segment, wherein the first network device receives packets from hosts connected to the network segment.

4. The method of claim 1, wherein the AP coupled to the first network device of the distributed gateway system and APs coupled to the other network devices of the distributed gateway system have the same service set identifier.

5. The method of claim 1, wherein the next hop message informs each of the other network devices of the distributed gateway system that the first network device is a next hop for packets destined for the identified associated host.

6. The method of claim 1, wherein the participation message informs each network device in the other network devices of the distributed gateway system to include the first network device in a flood list of said each network device in connection with processing a broadcast, unicast unknown, or multicast (BUM) packet.

7. The method of claim 1, further comprising the first network device:

receiving a next hop message advertised by a second network device in the distributed gateway system, the received next hop message identifying a remote host, wherein the second network device is a next hop to reach the remote host; and storing an entry in the forwarding database of the first network device that represents a mapping between the remote host and the second network device.

8. The method of claim 1, further comprising the first network device forwarding the received packet, including:

identifying a second network device in the distributed gateway system as a next hop network device based on next hop messages previously advertised by one of the network devices in the distributed gateway system; and forwarding the received packet to the identified next hop network device.

9. A distributed gateway system comprising:

a plurality of interconnected network devices, each network device coupled to a respective group of one or more access points (APs); and a management computer separate from the plurality of network devices and operative to configure the APs coupled to the plurality of network devices, wherein each network device in the plurality of network devices in the distributed gateway system comprises a computer-readable storage medium having stored thereon instructions for controlling each network device to:

receive a first packet from an access point (AP) coupled to the network device, the first packet containing an inner packet that was sent to the AP from a host associated with the AP;

store a mapping between the host and the AP;

receive a second packet from a second network device in the distributed gateway system, wherein the second packet is destined for the host associated with the AP; and forward the received second packet to a next hop, wherein the next hop is identified using the stored mapping between the host and the AP.

10. The distributed gateway system of claim 9, wherein the second packet is sent from a host associated to a second AP coupled to the second network device, wherein the AP coupled to the network device and the second AP define a network segment.

11. The distributed gateway system of claim 9, wherein the computer-readable storage medium further comprises instructions for controlling each network device to advertise a next hop message to other network devices in the distributed gateway system that represents a mapping between the host and the network device, in response to receiving the first packet.

12. The distributed gateway system of claim 11, wherein the next hop message informs the plurality of network devices that the network device is a next hop for packets destined for the host.

13. The distributed gateway system of claim 9, wherein the computer-readable storage medium further comprises instructions for controlling each network device to:

receive a next hop message from one of the plurality of network devices, the received next hop message including a mapping between a remote host and said one of the plurality of network devices, wherein said one of the plurality network devices is a next hop to reach the remote host; and store an entry in the forwarding database of the network device that represents the mapping between the remote host and said one of the plurality of network devices.

14. The distributed gateway system of claim 9, wherein the computer-readable storage medium further comprises instructions for controlling each network device to:

identify one of the plurality of network devices as a next hop based on next hop messages previously advertised by one of the network devices in the plurality of network devices and received by the network device; and forward an egress packet generated from the received packet to the identified next hop.

15. The distributed gateway system of claim 9, wherein the computer-readable storage medium further comprises instructions for controlling each network device to advertise a participation message to the plurality of network devices in response to receiving the first packet, the participation message indicating the network device's participation in flood lists that target a communication domain to which the AP belongs.

16. The distributed gateway system of claim 15, wherein the participation message informs each of the plurality of network devices to include the network device in a flood list of the network device in connection with processing a broadcast, unicast unknown, or multicast (BUM) packet.

17. The distributed gateway system of claim 15, wherein the network device advertises the participation message in response to the first packet being a packet received from the communication domain for the first time.

18. A method in a distributed gateway system, the gateway system comprising a plurality of network devices coupled to a plurality of access points (APs), the method comprising each network device:

receiving a first packet from an access point (AP) coupled to the network device, the first packet containing an inner packet that was sent to the AP from a host associated with the AP;

storing a mapping between the host and the AP;

receive a second packet from a second network device from the plurality of network devices, wherein the second packet is destined for the host associated with the AP; and forward the received second packet to a next hop, wherein the next hop is identified using the stored mapping between the host and the AP.

19. The method of claim 18, further comprising advertising a next hop message to other network devices in the distributed gateway system that represents a mapping between the host and the network device, in response to receiving the first packet.

20. The method of claim 18, further comprising receiving a next hop message from one of the plurality of network devices, the received next hop message including a mapping between a remote host and said one of the plurality of network devices, wherein said one of the plurality network devices is a next hop to reach the remote host; and storing an entry in the forwarding database of the network device that represents the mapping between the remote host and said one of the plurality of network devices.

* * * * *